United States Patent
Wu et al.

(10) Patent No.: US 8,343,668 B2
(45) Date of Patent: Jan. 1, 2013

(54) POROUS TIN PARTICLES AND THE PREPARATION FOR THE SAME

(75) Inventors: Nae-Lih Wu, Taipei (TW); Sung-Chieh Chao, Taipei (TW)

(73) Assignee: National Taiwan University, Taipei (TW)

(*) Notice: Subject to any disclaimer, the term of this patent is extended or adjusted under 35 U.S.C. 154(b) by 183 days.

(21) Appl. No.: 12/917,439

(22) Filed: Nov. 1, 2010

(65) Prior Publication Data
US 2011/0120874 A1 May 26, 2011

(30) Foreign Application Priority Data
Nov. 24, 2009 (TW) .............................. 98140012 A

(51) Int. Cl.
*H01M 4/13* (2010.01)
*H01M 4/40* (2006.01)
*H01M 4/58* (2010.01)

(52) U.S. Cl. .................. 429/231.95; 429/231.9; 75/343; 75/351; 75/367; 75/369; 75/691; 75/692

(58) Field of Classification Search ............... 429/231.9, 429/231.95; 75/343, 351, 367, 369, 691, 75/692
See application file for complete search history.

(56) References Cited

U.S. PATENT DOCUMENTS

| 7,244,513 B2 | 7/2007 | Li et al. |
| 2002/0029824 A1* | 3/2002 | Kawano et al. ............... 148/105 |
| 2007/0084309 A1* | 4/2007 | Akimoto et al. ............... 75/351 |

OTHER PUBLICATIONS

Liu, W.-R., Wu, N.-L., Shieh, D.-T., Wu, H.-C., Yang, M.-H., Korepp, C. Besenhard, J. O. and Winter, M. Synthesis and characterization of nanoporous NiSi-Si composite anode for lithium-ion batteries, J. Electrochem. Soc. 2007, 154(2): A97-A102.

* cited by examiner

*Primary Examiner* — Bruce Bell
(74) *Attorney, Agent, or Firm* — The PL Law Group, PLLC

(57) ABSTRACT

A porous tin particle and its preparation method are provided in the present invention. The method includes steps of: (a) performing a reductive (or reductive electrochemical) reaction on a tin particle which simultaneously reacts with lithium ions to form a tin-lithium (Sn—Li) alloy; and (b) performing an oxidative (or oxidative electrochemical) reaction on Sn—Li alloy to release the lithium ions therefrom, and the porous tin particle is formed. The porous tin particle could be further applied in manufacturing the electrochemical electrode for lithium-ion battery with longer cycle life and higher reversibility.

19 Claims, 2 Drawing Sheets

POROUS TIN PARTICLES AND THE PREPARATION FOR THE SAME

CROSS-REFERENCE TO RELATED APPLICATION AND CLAIM OF PRIORITY

This application claims the benefit of Taiwan Patent Application No. 098140012, filed on Nov. 24, 2009, in the Taiwan Patent and Trademark Office, the disclosures of which are incorporated herein in their entirety by reference.

FIELD OF THE INVENTION

The present invention relates to tin particles. In particular, the present invention relates to porous tin particles and the preparation for the same. The porous tin particles are applicable in preparing the electrode of lithium-ion (Li-ion) battery so as to improve the stability and life cycle of the electrode.

BACKGROUND OF THE INVENTION

Electricity stored and regenerated in batteries is done via reduction and oxidation occurred on cathode and anode, respectively. At present, graphite is widely used as an anode material for lithium-ion batteries for the electronic products due to the advantages of low cost, low and flat working voltage, and excellent reversibility. However, the disadvantage of graphite anode is its relatively low theoretical capacity (about 370 mAh/g or about 830 Ah/L). Thus, new anode materials are being explored by mixing tin metal with other elements (such as cobalt and carbon, etc.). Compared with graphite anode, tin anode has a specific capacity more than doubled and the overall battery capacity can be increased by 30%.

When the potential of tin metal is polarized to a sufficient low potential, tin metal is able to react with lithium ions to form an alloy and has high theoretical capability (about 993 mAh/g). However, since the severely volumetric expansion/contraction of electrode occurs during the charge/discharge (lithiation/delithiation) processes, it results in structural disruption and decreased cycle life/reversibility of electrode, and thus the commercialization of the tin metal anode material is impeded. For enhancing the cycle life/reversibility of the tin electrode and reducing the impact of the volumetric expansion/contraction thereof, pores and voids are preset in the conventional metal anode material to accommodate the required space after the metal expansion. It is the attempt to achieve the objects of increasing the entirely structural stability and cycle life/reversibility of electrode.

So far, there has been no report on making porous tin particles. U.S. Pat. No. 7,244,513 discloses that silicon powder are directly etched by the acidic solution for preparing silicon particles with porous outermost layers, where the prepared silicon particles are further manufactured as silicon nanoparticles using ultrasonic agitation. However, hydrogen fluoride and nitric acid are consumed in the etching method, and nitrogen dioxide is generated. Since an abundant amount of chemical materials are used to generate waste, the process would not conform more and more rigid environmental standards. Liu et al. (2007) indicated that the nickel (Ni) and silicon (Si) are partially reacted using planetary mill to form an intermediate phase of Ni/Si/NiSi composite, and then the unreacted Ni in the composite is dissolved with acidic solution to obtain the porous NiSi alloy particles. However, the process is complicated and elaborated, plenty of acidic wastes are generated, the manufacturing cost is high, and the environment is severely damaged.

Therefore, it is an important issue to research the preparing method of tin anode electrode while reducing the use of reaction materials and the waste production, and keeping the high capability and cycle life.

It is therefore attempted by the applicant to resolve the above situation encountered in the prior article.

SUMMARY OF THE INVENTION

For overcoming the structural disruption of electrode due to severely volumetric expansion/contraction thereof occurring in the charge/discharge processes, enhancing cycle life/reversibility, and reducing the use of toxic chemical materials and waste production, a process involving lithiation and delithiation of tin metal is disclosed in the present invention for obtaining porous tin particles. The porous tin particles are further applicable to manufacturing the lithium ion batteries with longer cycle life and higher reversibility.

Therefore, the present invention provides a method for preparing porous tin particles, including the following steps of: (a) performing reduction on tin particles and lithium ions to form tin-lithium alloys; and (b) performing an oxidation on the tin-lithium alloys to form porous tin particles.

According to an embodiment of the present invention, the reduction in step (a) is performed by supplementing a reductant, or the reduction is a reductive electrochemical reaction by supplying a voltage. Furthermore, the oxidation in step (b) is performed by supplementing an oxidant, or the oxidation is an oxidative electrochemical reaction by supplying a voltage.

Step (b) further includes steps of: (b1) removing the lithium ions from the tin-lithium alloy to form a tin structure; and (b2) crystallizing the tin structure to form pores of the porous tin particle.

In addition, according to embodiments of the present invention provides porous tin particles having a ratio of the total pore volume to the total particle volume ranging between 10% and 70% and pore sizes ranging between 0.001 μm and 3 μm. The porous tin particle is obtained by the aforementioned manufacturing method, wherein reduction and oxidation are performed in the same solution or different solutions. Alternatively, reduction and oxidation are performed in an electrolyte solution, which is made by dissolving lithium hexafluorophosphate ($LiPF_6$) in an ethylene carbonate-ethyl methyl carbonate solution.

Furthermore, the porous tin particle may be manufactured to form an electrochemical electrode.

In addition, the present invention provides a method for preparing porous particles, including steps of: (a) performing a reduction on metal particles and ions to form alloys; and (b) performing oxidation on the alloys to form metal porous particle.

In one embodiment, the metal particle includes tin particle, the ions include lithium ions, and the porous particle includes porous tin particle.

The above objectives and advantages of the present invention will become more readily apparent to those ordinarily skilled in the art after reviewing the following detailed descriptions and accompanying drawings.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION

The present invention will now be described more specifically with reference to the following Embodiments. It is to be noted that the following descriptions of preferred Embodiments of this invention are presented herein for purpose of illustration and description only; it is not intended to be exhaustive or to be limited to the precise form disclosed.

Figure 1:
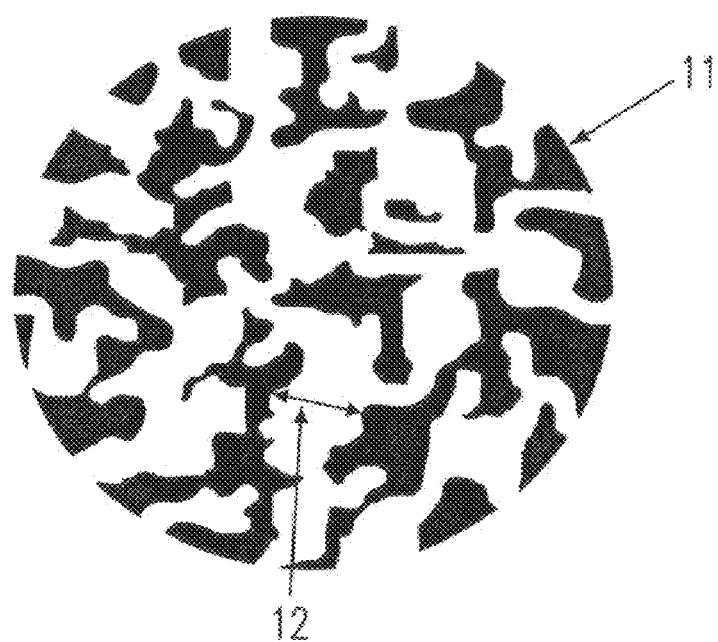
FIG. 1 depicts the diagram showing the porous tin particle of the present invention.

Please refer to FIG. 1, which depicts the diagram showing the porous tin particle of the present invention. In FIG. 1, the particle porosity of the porous tin particle 11 is defined as the ratio of the total pore volume (Vp) to the total particle volume (Vo), and the Vp/Vo value is ranged between 10% and 70%. The pore size 12 of the porous tin particle 11 is ranged between 0.001 μm and 3 μm. The shapes and sizes of the pores are not identical, and the pores are arbitrarily distributed inside the porous tin particle.

The First Embodiment

The porous tin particles in the first embodiment are obtained by performing an reductive electrochemical reaction and an oxidative electrochemical reaction subsequently.

Figure 2A:
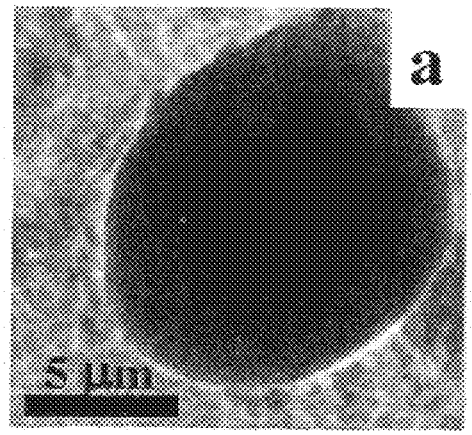
FIGS. 2a to 2c depict the transmission X-ray electron micrographs of a porous tin particle in the present invention. The scales in FIGS. 2a through 2c are the same.
Figure 2B:
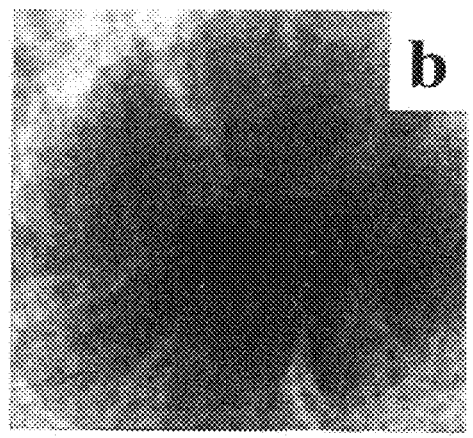

First, tin particles with an average particle size of 7.3 μm are dispersed in a graphite matrix, which then is pressed as an electrode. Please refer to FIG. 2a, which depicts the transmission X-ray electron micrograph with gray level intensity. Tin particles are shown as the black tangible particles since X-ray cannot transmit therethrough. In addition, the scales in FIGS. 2a through 2c are the same while the scale is only shown in FIG. 2a.

The electrode containing the tin particles is as a working electrode and lithium foil as the counter electrode. They are exposed to the electrolyte containing lithium ions. The electrolyte is obtained by dissolving lithium hexafluorophosphate ($LiPF_6$) in an ethylene carbonate-ethyl methyl carbonate solution (the volume ratio of ethylene carbonate to ethyl methyl carbonate=1:2), wherein the concentration of $LiPF_6$ is 1.0 M. The electric potential is gradually decreased to 0.001 volt within 3.6 hours upon the reductive electrochemical reaction. During the voltage decreasing process, lithium ions gradually insert into tin particles to result in the expansion of tin particles, and the result is shown in FIG. 2b. The particle size of the expanded tin-lithium (Sn—Li) alloy after charging is significantly larger than that of the original tin particles.

The electric potential is then increased to 1.5 volt and is maintained for 3 hours upon the oxidative electrochemical reaction. During the voltage-increasing process, the lithium ions emigrate out of the Sn—Li alloy or return to the electrolyte. Subsequently, the left tin metal locally crystallize to form the pores within the particles (FIG. 2c).

Figure 2C:
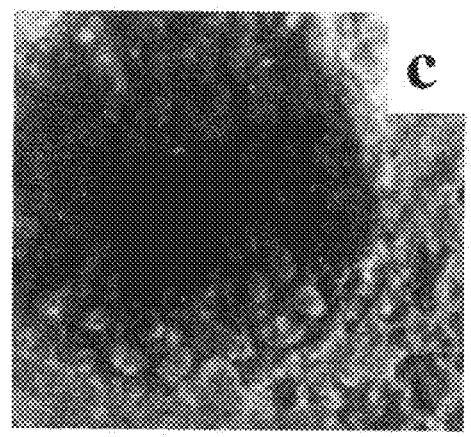

Please refer to FIG. 2c, plural porous structures are represented in the porous tin particle, the black portion is the tangible tin particle skeleton, and the grayish-white portion is the hollow area. The pore size in the hollow area is ranged between 0.25 μm and 1.5 μm. The final volume of tin particles is enlarged for 1.85 times (equivalent to particle porosity of 46%) relative to the size of the original tin particles. After many experiments carried out based on the first embodiment, the pore size and particle porosity of the afforded tin particle are ranged between 0.001 μm and 3 μm and between 10% and 70%, respectively.

The Second Embodiment

The porous tin particles are obtaining by carrying out the reduction and the oxidation sequentially.

In the second embodiment, the step of incorporating the lithium ions into the tin particle is performed by adding a reductant in the solution to replace the voltage decreasing step. Similarly, the step of removing lithium ions from Sn—Li alloy is performed by adding an oxidant to replace the voltage increasing step.

Although the first and the second embodiments are performed by applying the reductive/oxidative electrochemical reactions and the reduction/oxidation, respectively, the skilled person in the art is able to combine the steps of the first and the second embodiments. For instance, reductive electrochemical reaction is carried out first, and then oxidation is performed by adding the oxidant. Alternatively, reduction is carried out firstly by adding reductant, and then oxidative electrochemical reaction is performed.

In addition, the porous tin particles of the present invention can be obtained in the same solution. Alternatively, the reductive (electrochemical) reaction performed in a solution first, and then the Sn—Li alloy is disposed in another solution to carry out the oxidative (electrochemical) reaction. Solutions can be organic solutions, aqueous solutions or ionic liquid solutions.

Therefore, the electrochemical electrode can be further manufactured by the skilled person in the art in accordance with the aforementioned method and the prepared porous tin particles. Furthermore, since strong acidic solutions are not used, the production cost and the impact on environmental are effectively decreased, and the present invention owns the significant marketing value.

While the invention has been described in terms of what is presently considered to be the most practical and preferred Embodiments, it is to be understood that the invention needs not be limited to the disclosed Embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for preparing porous tin particles, comprising steps of:
   (a) performing reduction on tin particles and lithium ions to form tin-lithium alloys; and
   (b) performing oxidation on the tin-lithium alloys to form the porous tin particles.

2. The method according to claim 1, wherein step (a) is performed by supplementing a reductant.

3. The method according to claim 1, wherein step (a) is a reductive electrochemical reaction.

4. The method according to claim 3, wherein the reductive electrochemical reaction is performed by supplying a voltage.

5. The method according to claim 1, wherein step (b) is performed by supplementing an oxidant.

6. The method according to claim 1, wherein step (b) is an oxidative electrochemical reaction.

7. The method according to claim 6, wherein the oxidative electrochemical reaction is performed by supplying a voltage.

8. The method according to claim 1, wherein the step (b) further comprises steps of:
   (b1) removing the lithium ions from the tin-lithium alloy to form a tin structure; and (b2) crystallizing the tin structure to form pores of the porous tin particle.

9. A porous tin particle having a ratio of a total pore volume to a total particle volume ranging between 10% and 70%.

10. The porous tin particle according to claim 9, further comprising pore sizes ranging between 0.001 micrometer and 3 micrometer.

11. An electrochemical electrode containing porous tin particles according to claim 9.

12. A porous tin particle comprising pore sizes ranging between 0.001 µm and 3 µm.

13. The porous tin particle according to claim 12, being prepared by performing a reduction on a tin particle and lithium ions to form a tin-lithium alloy and then performing an oxidation on the tin-lithium alloy.

14. The porous tin particle according to claim 13, wherein the reduction and the oxidation are performed in one solution and two different solutions.

15. The porous tin particle according to claim 13, wherein the reduction and the oxidation are performed in an electrolyte solution.

16. The porous tin particle according to claim 15, wherein the electrolyte solution is one selected from a group consisting of an organic solution, an aqueous solution and an ionic liquid solution.

17. The porous tin particle according to claim 15, wherein the electrolyte solution is made by dissolving lithium hexafluorophosphate ($LiPF_6$) in an ethylene carbonate-ethyl methyl carbonate solution.

18. A method for preparing porous metal particle, comprising steps of:
   (a) performing reduction on a metal particle and ions to form an alloy; and
   (b) performing an oxidation on the alloy to form the porous particle.

19. The method according to claim 18, wherein the metal particle comprises a tin particle, the ions comprise lithium ions, and the porous particle comprises a porous tin particle.

* * * * *